United States Patent
Levi et al.

[11] Patent Number: 5,270,593
[45] Date of Patent: Dec. 14, 1993

[54] AIR CORED, LINEAR INDUCTION MOTOR FOR MAGNETICALLY LEVITATED SYSTEMS

[76] Inventors: Enrico Levi, 110-20 71st Rd., Forest Hills, N.Y. 11375; Zivan Zabar, 99-72 66th Rd., Rego Park, N.Y. 11374

[21] Appl. No.: 974,177

[22] Filed: Nov. 10, 1992

[51] Int. Cl.⁵ .................. H02K 41/02; B60L 13/04
[52] U.S. Cl. ............................ 310/12; 104/282; 104/292
[58] Field of Search ................ 310/12, 14, 13; 104/281, 282, 283, 284, 292

[56] References Cited

U.S. PATENT DOCUMENTS

| | | | |
|---|---|---|---|
| 4,839,543 | 6/1989 | Beakley et al. | 310/12 |
| 5,085,149 | 2/1992 | Huson | 104/281 |

FOREIGN PATENT DOCUMENTS 9101908  2/1991  PCT Int'l Appl. ............ 104/292
0895770  1/1982  U.S.S.R. ...................... 104/281

Primary Examiner—Steven L. Stephan
Assistant Examiner—Judson H. Jones
Attorney, Agent, or Firm—Curtis, Morris & Safford

[57] ABSTRACT

Apparatus for propelling, suspending and guiding a conveyance across ground without contact between said conveyance and said ground, comprising an electromagnetic, air cored induction motor including a primary formed of a coaxial array of coils; means for energizing said coils with polyphase electrical alternating currents to create an electromagnetic wave traveling longitudinally along the array; a secondary formed of a sleeve concentric to and surrounding said array of coils and made of conducting material, said sleeve being electromagnetically coupled to said primary and being cut along a longitudinal generatrix thereof to define a slot permitting the support means which supports the primary to pass there through.

8 Claims, 6 Drawing Sheets

AIR CORED, LINEAR INDUCTION MOTOR FOR MAGNETICALLY LEVITATED SYSTEMS

BACKGROUND OF THE INVENTION

Linear motion, such as needed for ground transportation, requires the implementation of (1) propulsion, (2) suspension, and (3) guidance. In conventional wheel-on-rail systems these functions are performed by the wheel through the mediation of friction. If slipping between the driving wheels and the rail is to be prevented, the following inequality must be satisfied between the traction effort or thrust T and the weight W of the locomotive: $T \leq aW$, where $a$, the coefficient of friction decreases with increasing speed. This inequality sets a practical upper limit of about 300 miles/hour for conventional wheel-on-rail roads.

Linear electric motors in which one of the parts in relative motion is carried by the vehicle, while the other lies straight along the track develop three force components: the one in the direction of motion provides the tractive effort needed for propulsion, the other two components perpendicular to the direction of motion, while present, are usually too weak to fulfill the remaining two functions of the wheel, suspension and guidance.

The idea of associating electromechanical power conversion with linear motion dates back to Faraday in the early 1830's, but its recent popularity is largely due to the promotional effort of Prof. E. R. Laithwaite of the Imperial College in London. His motors are of the induction type and utilize iron cores to carry the magnetic flux. Motors of the synchronous types have been adopted for further development in Germany and Japan. The German system utilizes iron cores, while the Japanese one makes use of air cores and superconducting magnets. All three systems are energized by the wayside and the two parts in relative motion are separated by planar air gaps.

The main disadvantage of iron-cored motors is the need to maintain an airgap clearance not exceeding three-eights of an inch. At high speeds this is difficult to achieve and implies high track-maintenance costs. The main disadvantage of the synchronous mode of operation is the need to maintain a perfect match between the vehicle speed and the frequency of the energy supply system and this requires expensive power-conditioning apparatus extending over the whole length of the track.

The air-cored, induction, magnetic levitation system which forms the object of this patent overcomes both these drawbacks, in that being air-cored, it allows an air-gap clearance of a few inches, and being operated in the induction mode allows energization by means of constant, industrial-frequency supplies. Moreover, its special topology with cylindrical air gap develops force components which are strong enough to provide suspension and guidance.

In accordance with the present invention, the energized part of the motor or primary consists of an array of coaxial circular coils or of a helically wound cylindrical solenoid. The primary is divided into sections which are energized sequentially by a plural phase or polyphase system of alternating currents. Thereby producing a traveling wave of magnetic flux density. This flux is coupled to the passive part of the motor or secondary, which ideally consists of a cylindrical sleeve made of conducting material, such as aluminum, located concentric and exterior to the primary.

The relative motion, or slip between the wave traveling along the primary and the secondary induces purely azimuthal currents in the secondary sleeve. The interaction between the primary and secondary currents creates a longitudinal force component used for propulsion and a strong radial centering force component used for levitation and guidance. However, in order to allow for mechanical support of the interior primary, the exterior cylindrical secondary sleeve must be cut along a longitudinal generatrix. In this case, the currents induced in the secondary maintain their azimuthal direction over most of the cylindrical surface and turn longitudinal in the proximity of the cut to close along its two brims through outwards extended ribs.

These longitudinal portions of the secondary currents being in opposite direction in the two brims and having no counterpart in the primary produce no appreciable force and, therefore, degrade only minimally the performance of the ideal motor in its propulsion, levitation, and guidance functions.

The decision on whether to locate the energized primary by the wayside or on board the conveyance depends on economic considerations. Energization from the wayside is advantageous when the density of traffic is high. The primary is then energized in blocks of about 5 miles length for the sake of efficiency and in order to allow for emergency braking by means of phase reversal. In this case, the conveyance carries only the passive secondary and is, therefore, much cheaper and somewhat lighter. When, instead, the energized primary is carried by the conveyance and the passive secondary lies along the road way, the track is cheaper. However, energization on board the conveyance implies the need for either current collection by catenary or third rail, or the need for prime energy storage and conversion apparatus located on board the conveyance.

OBJECTS OF THE INVENTION

Therefore, it is an object of the present invention to provide an improved linear electric motor which fulfills the functions of suspension and guidance in addition to propulsion and which overcomes the drawbacks and deficiencies of existing motors, mentioned above.

Another object of this invention is to provide a motor for high-speed ground transportation which can be energized at industrial frequencies that is, at frequencies normally generated or supplied by power utilities, thereby leading to a very simple system, having a low number of components, high reliability, high efficiency and low first investment and running costs.

A further object of this invention is to provide operation at variable speed with high acceleration and emergency braking, without the need for very expensive power conditioning apparatus.

Another object is to maximize the electromagnetic coupling between the energized primary and the passive secondary so as to minimize the magnetizing current and exposure of personnel and passengers to magnetic fields, distribute evenly the propulsion, suspension, and guidance forces over the cylindrical surface of the energized primary and passive secondary, while allowing the utilization of ordinary, industrial-frequency supplies.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for the electric propulsion of a conveyance without the need for physical contact with a base or stationary body such as the ground. The apparatus is an air-cored, linear induction motor of which the energized primary consists of an array of coaxial circular coils or of a helically wound cylindrical solenoid and concentric passive secondary sleeve made of conducting material disposed externally of the primary. The cylindrical sleeve is cut along one of its longitudinal generatrices, which defines a slot to allow the mechanical support of the interior primary to pass there through. The primary is divided into sections which are energized sequentially by a system of polyphase alternating currents. These azimuthal currents excite an array of North and South magnetic poles that travel longitudinally over the cylindrical surface of the primary. The longitudinal motion of the traveling electromagnetic wave relative to the secondary sleeve induces in it a system of currents which flow mainly in the azimuthal direction and which interact with the primary currents to produce mechanical forces evenly distributed over the cylindrical surfaces of the primary and of the secondary. Of these forces the axial components are used for propulsion, while the radial components tend to center the secondary sleeve with respect to the primary, thus providing for suspension and guidance.

The main feature of the concentric location of the primary and secondary is the confinement of the magnetic flux that is carried by the inner core of the primary and that closes mainly in the cylindrical air gap between the primary and the secondary. This permits the elimination of the iron cores without increasing unduly the magnitude of the magnetization current needed for the establishment of the magnetic field and the exposure of personnel and passengers to magnetic fields.

Another feature deriving from the cylindrical symmetry of the primary and secondary is that all portions of the current-carrying conductors contribute to the generation of useful forces. This leads to high efficiency with a minimum of material stresses, physical dimensions, and cost of the apparatus.

As another feature of this invention, operation in the asynchronous mode not only permits the utilization of ordinary, constant, industrial-frequency supplies, but also eliminates the need for superconducting magnets which are impractical with today's technology.

As another feature of this invention, the properties of induction motors can be used to provide a variable thrust at all speeds from stalling to full speed. The rate of acceleration can be made as high as desired with the selection, at the design stage, of an appropriate electrical resistance in the secondary. In addition, emergency braking can be accomplished simply with the reversal of the cinnections to two of the phases feeding the primary. The use of these properties eliminates the need for expensive power conditioning apparatus.

BRIEF DESCRIPTION OF THE DRAWINGS

The following detailed description, given by way of example, will be best understood in conjunction with the accompanying drawings in which:

FIG. 5($a$) is a frontal view and FIG. 5($b$) is a side view.

DETAILED DESCRIPTION OF A PREFERRED EMBODIMENT

Figure 1:
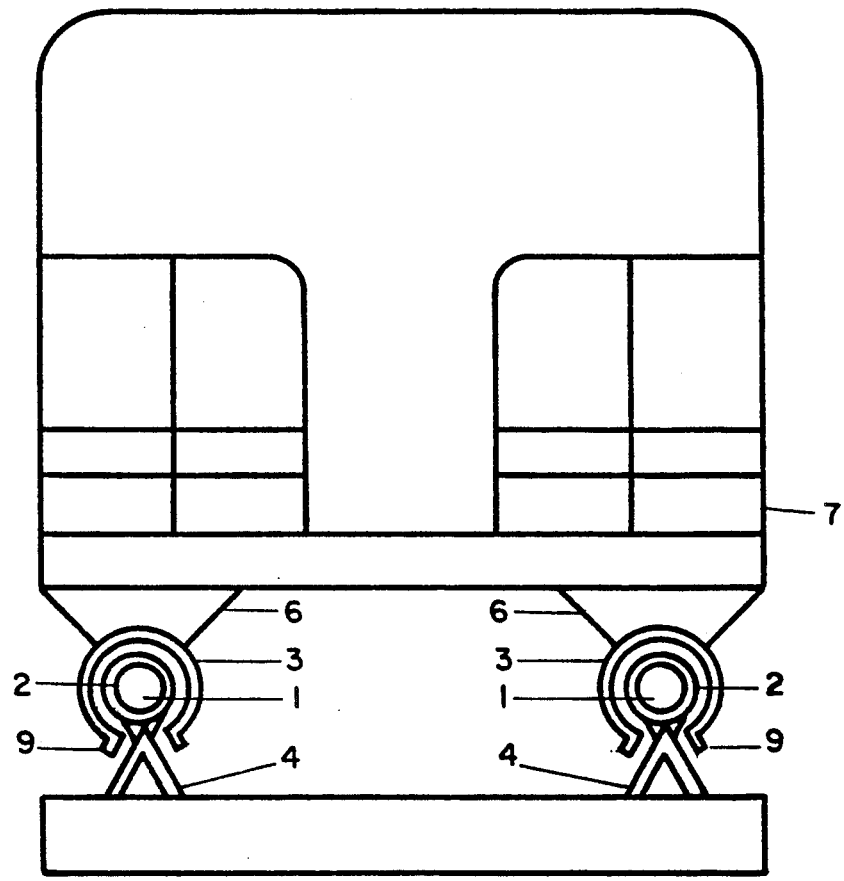
FIG. 1 is a schematic representation in cross section of a conveyance utilizing the present invention with energization on the wayside.

Referring now to FIG. 1, there is illustrated a schematic representation of an air-cored, linear induction motor 1 for magnetically levitated systems. It is comprised of an energized primary 2 laid on the wayside along the whole length of the track and of a short passive secondary 3 (shown as a sleeve) carried on board the conveyance 7. The primary 1 is attached to the track foundation 5 by means of supports 4, whereas the passive secondary 3 is attached to the conveyance 7 by means of supports 6. The energized primary includes an array of coaxial circular coils grouped into sections each comprised of respective phases and supplied by respective phases of a polyphase electrical system of alternating currents having a sequential phase lag equal to 360° divided by the number of phases in a section, so as to create an electromagnetic wave traveling along the array at a speed equal to the product of the frequency times the distance between equal phases, that is, frequency times wavelength. Alternatively, the energized primary may be formed of a helically wound circular solenoid tapped at equal intervals to provide leads for the various phases.

Design guidelines are followed that are based on the fact that energy is transferred from the primary to the secondary through the air gap that separates one from the other. The surface of the air gap, i.e. its cross section in the direction of the transfer of energy, is the parameter determining the main dimensions of the motor. If A denotes the gap surface, the surface force density $f_s$ is given by the ratio of the thrust T over the gap surface A. This force density is related to the mechanical, electrical, and thermal stresses and cannot exceed allowable limits. It is expedient to express this surface force density $f_s$ in terms of the magnetic energy density which is given by $$\frac{1}{2}\frac{B^2}{\mu_0}$$

where B is the magnetic flux density in Tesla and $\mu_0 = 4\pi \cdot 10^7$ Henry/m is the permeability of vacuum. It follows that the gap surface can be obtained as $$A = \frac{T}{f_s} = \frac{T}{B^2/2\mu_0}$$

In the apparatus which forms the object of this patent the gap surface is cylindrical so that $A = 2\pi r_g l_s$, where $r_g$ is the average gap radius and $l_s$ the axial length of the short part of the motor.

The ratio $(l_s/r_g)$ is dictated by economic considerations.

It follows that the main dimensions of the air gap are:

$$r_g = \sqrt{\frac{1}{2\pi}\left(\frac{r_g}{l_s}\right)\frac{T}{B^2/2\mu_0}} \text{ and } l_s = \frac{r_g}{r_g/l_s}.$$

Efficiency considerations force operation at very low values of slip S between the electromagnetic traveling wave and the sleeve. It follows that the cruising speed $v$ can be used to approximate the velocity of the traveling wave $v_s$ which, in turn is related to the electrical frequency f and the pole pitch $\tau$ as $v_s = 2\tau f \approx v$.

As a result, the width $w_c$ of the coils for a m-phase winding (with return current) is $$w_c = \frac{\tau}{m} = \frac{v}{2mf}.$$

Knowledge of the coil width allows to relate the phase current $I_p$ to the surface current K as $$K = \frac{N_c I_p}{w_c}$$

where $N_c$ is the number of turns per coil. The value K in turn is related to the flux density B as $$K = \frac{2B}{\mu_0}.$$

It follows that with a specified B, the required phase current can be found as $$I_p = \frac{w_c}{N_c} K = \frac{2w_c B}{\mu_0 N_c} \text{ or } I_p = \frac{vB}{\mu_0 mfN_c}.$$

The number of turns per coils $N_c$ is also related to the phase voltage $V_p$ that, with 2 p series connected coils per phase, is $V_p \approx 2p\ N_c(2\pi\ r_g)\ v_s\ B$, where p is the number of pole pairs. The choice of the number of turns $N_c$ per coil is the results of the trade-off between the requirements of keeping the phase voltage $V_p$, and with it the level of electrical insulation, as low as possible and of keeping the phase current $I_p$, and with it the ohmic losses in the leads, as low as possible.

In the design guidlines above, a number of approximations, which are adequate for a preliminary design, has led to the determination of the main dimensions of the motor on the basis of the specified thrust T, a performance parameter, the frequency f and number of phases m, data dictated by the supply system, and the flux density B, which is an index of the allowable electrical, mechanical, and thermal stresses.

In general, once the requirement of the specified thrust has been satisfied, the requirements for guidance and suspension forces are also satisfied, because $$\frac{\text{Transverse force}}{\text{Thrust}} \approx 4 \frac{S}{S_p},$$

where $S_p$ is the value of the slip at which the thrust peaks, and the value of the transverse force is several times that of the thrust.

Figure 2:
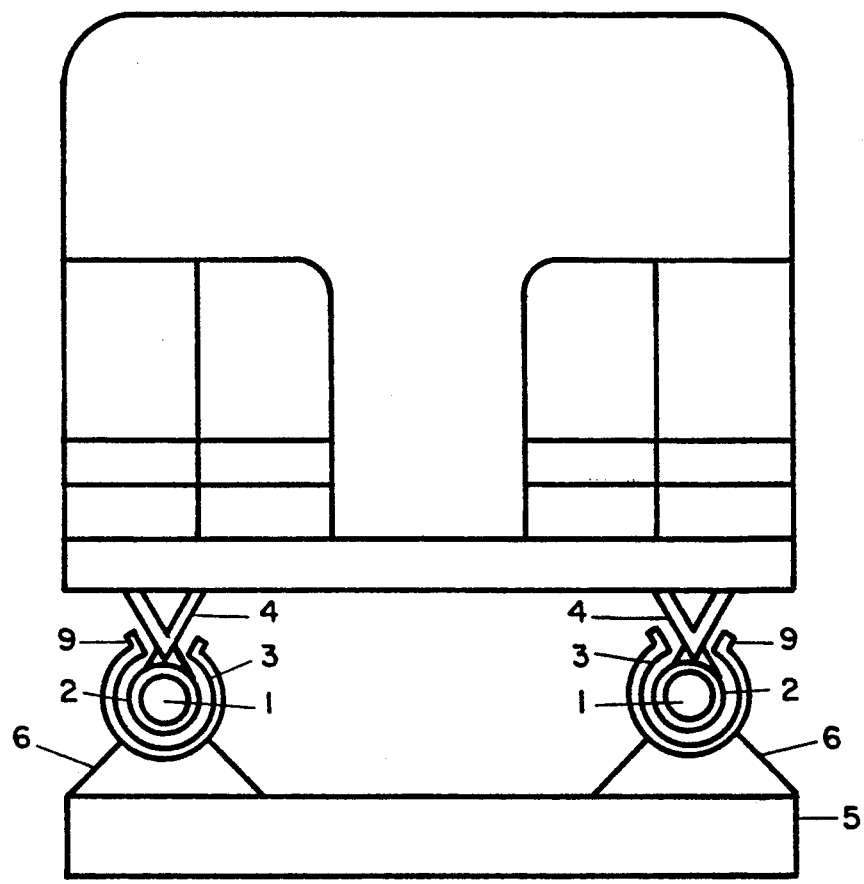
FIG. 2 is a schematic representation in cross section of a conveyance utilizing the present invention with energization on board the conveyance.

Referring now to FIG. 2, there is also illustrated a schematic representation of an air-cored, linear induction motor as in FIG. 1, but with the location of the energized and passive parts inverted, that is, the energized primary 2 is short and is carried on board the conveyance and the passive secondary 3 is shown as a sleeve laid on the wayside along the whole length of the track.

Figure 3:
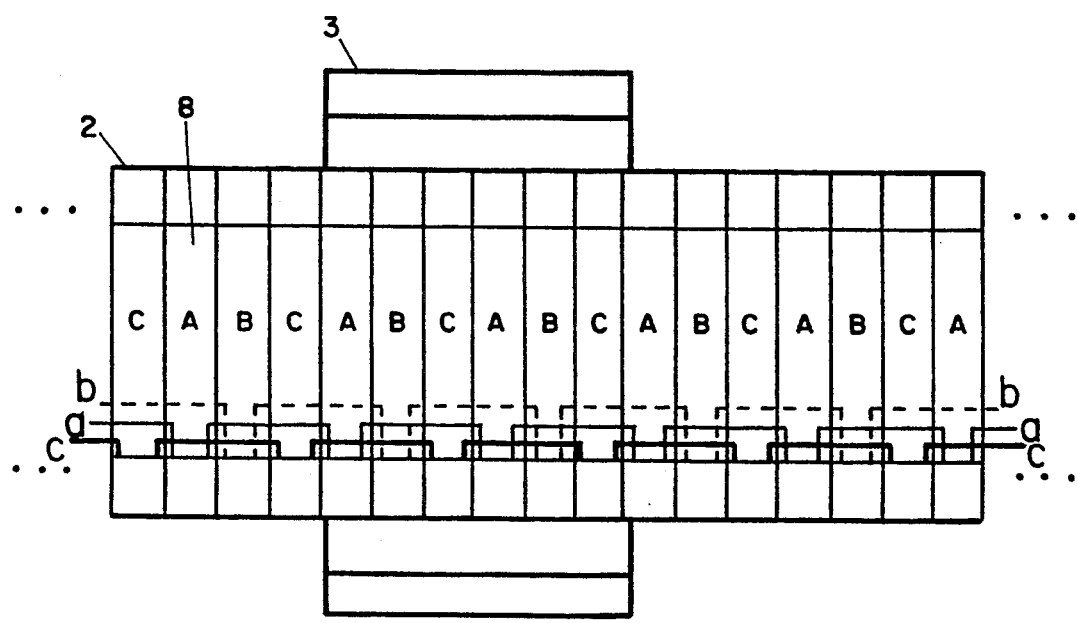
FIG. 3 is a schematic representation in cross section of the apparatus having a three phase primary with one coil per phase per pole pair and an exterior secondary. Coils belonging to the same phase are shown connected in series.

Referring now to FIG. 3, there is illustrated a view of sections of the energized primary 2 and of the passive secondary 3. FIG. 3 assumes as an example, that the motor has one coil 8 per phase per pole pair. That means, three phase currents from a three phase source, are separately fed through wires a, b, c, to three consecutive coils in the primary 2. Each coil may have one or, preferably, many turns. The coils of phase A are assumed to be connected in series. The same is assumed for the coils of phase B, and for the coils of phase C. Alternatively, the coils of each phase may be connected in parallel.

Figure 4:
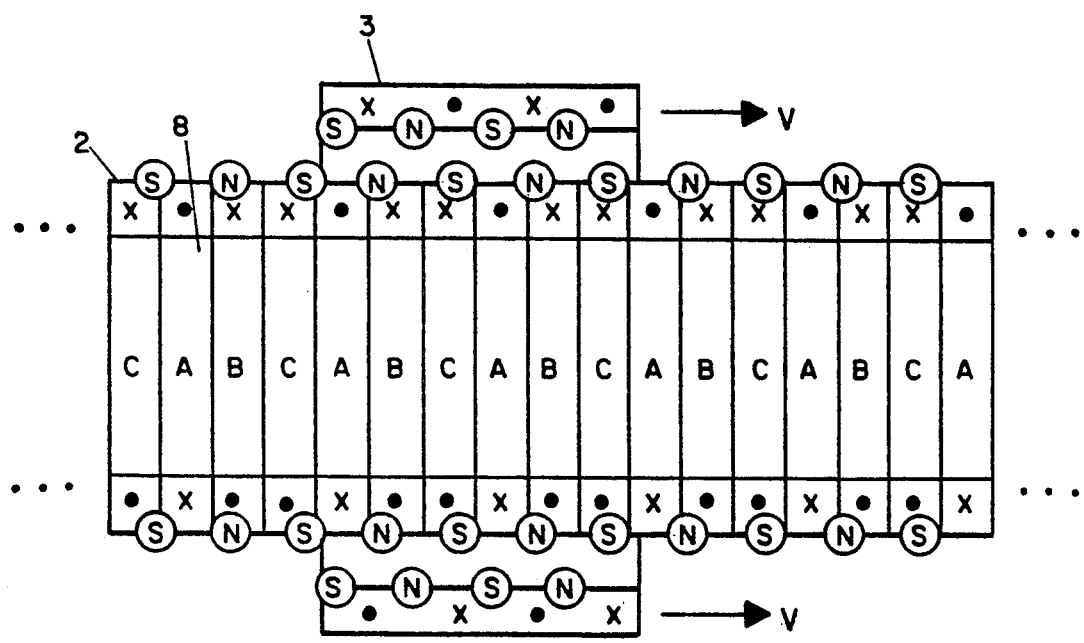
FIG. 4 illustrates the same cross section as FIG. 3, and shows the direction of the currents in the coils and the polarity of magnetic field they generate outside the energized primary and inside the exterior secondary.

Referring now to FIG. 4, there is illustrated a view of sections of the energized primary 2 and of the passive secondary 3, as in FIG. 3. That means, the three phase system of currents, phases A, B, and C, are separately fed to any three consecutive coils in the primary 2 to generate one wave length. Currents in the coils of the primary 2 are indicated by dots and crosses. Crosses indicate current flow downwards into the page, and dots indicate current flow upwards, out of the page. A magnetic field is produced by these phase currents as indicated by the set of South and North poles shown near the coils of the primary 2. The direction of the currents and the polarity of the magnetic field are shown at an instant in which the current in phase A reaches a peak. This magnetic field moves to the right due to the phasing of the currents. As a result, azimuthal currents are induced in the conductor of the secondary 3, in the directions shown. These currents produce a similar magnetic field, and a similar set of South and North poles. This set of current-generated poles in secondary 3 is displaced a short distance to the right of the set of current-generated poles in primary 2. The secondary 3 moves to the right because like magnetic poles repel, and unlike poles attract. The movement of the magnetic field in the primary 2 drags the secondary 3 along with it. The forces between the poles in primary 2 and secondary 3 also act to center the secondary 3 with respect to the primary 2.

Figure 5A:
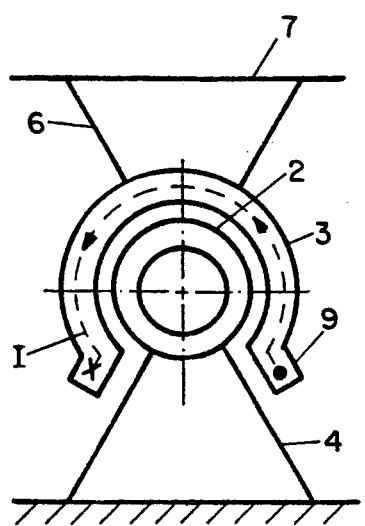
FIG. 5 is an enlarged view of the apparatus showing the paths of the currents in the split passive secondary sleeve.
Figure 5B:
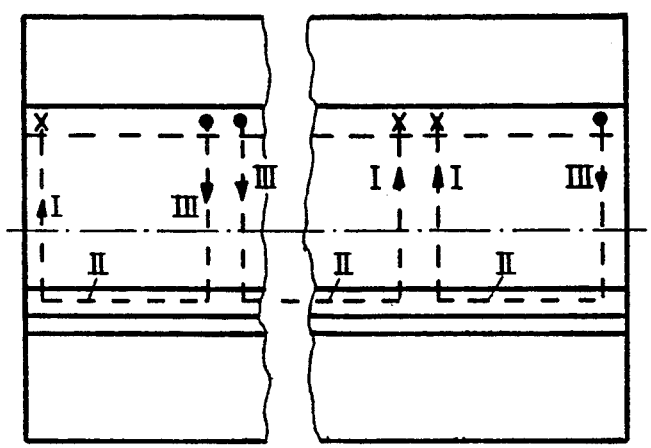

Referring now to FIG. 5, there is illustrated a frontal view (a) and a side view (b) of the apparatus indicating the path of the currents in the secondary. In particular are shown the ribs 9 which line the brims of the split secondary sleeve. They provide a low-resistance longitudinal path for closure of the azimuthal currents induced in the split secondary sleeve, and also provide additional mechanical strength. As in FIG. 4, crosses indicate current flow downward into the page and dots indicate flow upwards out of the page. The currents which flow in the cylindrical portion of the sleeve in the azimuthal direction are denoted by the roman numerals I and III, The currents which flow in the rib 9 in the axial direction are denoted by roman numeral II.

Figure 6:
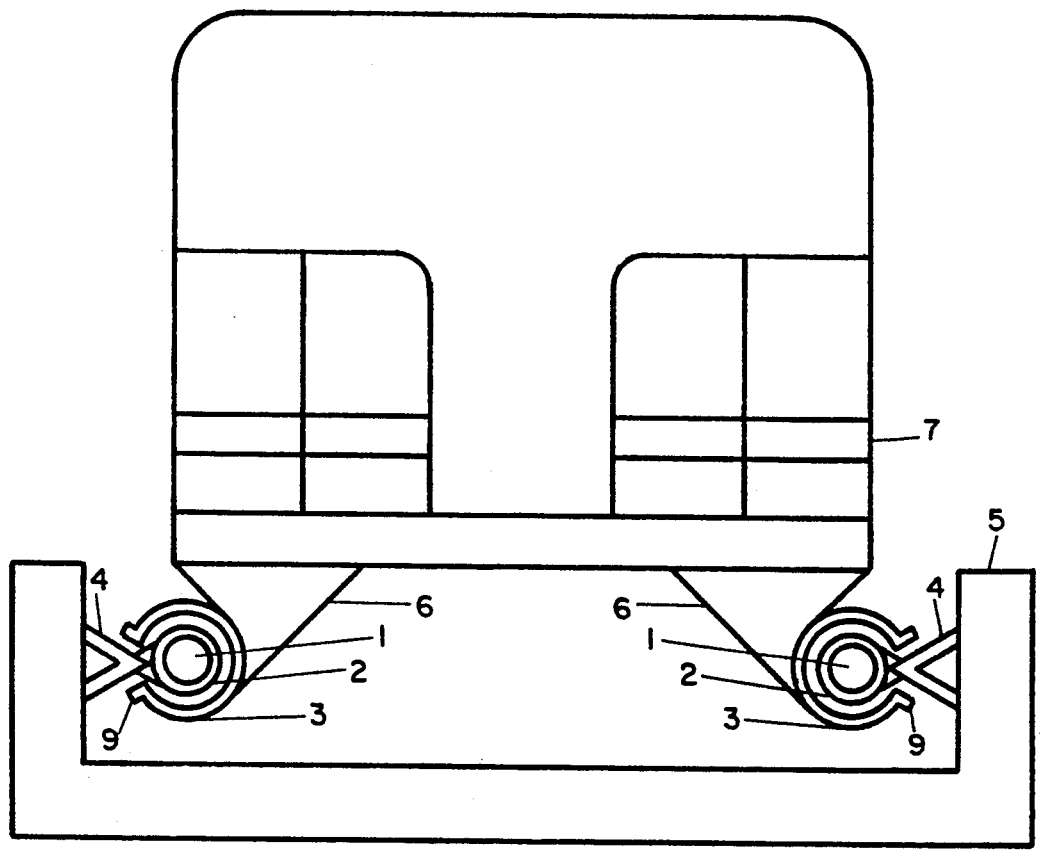
FIG. 6 shows an orientation of the split passive secondary sleeve and of the supports other than the vertical support shown in FIGS. 1 and 2.

Referring now to FIG. 6, there is illustrated an alternative orientation of the split or slot in the passive secondary sleeve to show how different performance specifications with regard to the partition among the propulsion, suspension, and guidance force components can be satisfied by locating the slot on a plane other than the vertical one. The particular orientation of this figure, with the slot disposed in a generally horizonthal plan, is suited for heavier vehicles in which the performance specifications call for a higher ratio of suspension to propulsion and guidance forces.

The following is one numerical example of the invention:

| Performance Specifications | |
| --- | --- |
| Cruising speed $v$ | 400 miles/hour = 179 m/sec |
| Vehicle weight $W_v$ | 50 Tonnes = $4.9 \cdot 10^5$N |
| Power P | 65 MW |
| Phase voltage $V_p$ | 538 V |
| Phase current $I_p$ | 158 A |
| Number of phases m | 3 |
| Frequency f | 60 Hz |
| Thrust $T = P/v$ | $3.65 \cdot 10^5$N |
| Clearance c | 2" = 0.051 m |

Selection of the value B=0.2 T leads to the following dimensions:

A. Energization by the wayside (at 60 Hz)
   Coils: $OD_c = 8" = 0.2$ m; $ID_c = 5\frac{1}{2}" = 0.14$ m; $N_c = 1$
   Materials: Aluminum
   Weight: $W_c = 43$ kg/m = $2 \times 70$ tonnes/mile
   Passive Armature: $ID_a = 12" = 0.3$ m; $OD_a = 14\ 13/32" = 0.36$ m (sleeve)
   Length: $l_a = 4 \times 3.57$ m
   Material: Aluminum
   Weight: $W_a = 4 \times 300$ kg
B. Energization On Board Vehicle
   Coils: $OD_c\ 8" = 0.2$ m; $ID_c = 5\frac{1}{2}" = 0.14$ m; $N_c = 1$
   Length: $l_c = 4 \times 3.57$ m
   Material: Aluminum
   Weight: $W_c = 4 \times 153$ kg
   Passive Armature: $ID_a = 12" = 0.3$ m; $OD_a = 14\ 13/32" = 0.36$ m (sleeve)
   Material: Aluminum
   Weight: $W_a = 84$ kg/m = $2 \times 135$ tonnes/mile It is intended that the appended claims be interpreted as including the specific embodiment described herein, the foregoing alternatives and modifications, and all other equivalents thereto.

What is claimed is:

1. Apparatus for propelling, suspending and guiding a conveyance across ground without contact between said conveyance and said ground, comprising an electromagnetic, air-cored induction motor including a primary formed of a coaxial array of coils having a core consisting essentially of air and having a cylindrical surface; means for energizing said coils with polyphase electrical alternating currents to create an electromagnetic wave traveling longitudinally along the array; a secondary formed of a cylindrical sleeve concentric to and surrounding said array of coils and made of conducting material and having a cylindrical surface opposite the cylindrical surface of said primary, said sleeve being electromagnetically coupled to said primary and spaced therefrom by a substantially uniform gap, such that when said primary is energized, azimuthal currents are induced in said secondary to generate simultaneous propulsion, suspension and guidance forces over the cylindrical surfaces of said primary and said secondary; said sleeve being cut along longitudinal generatrix thereof to define a slot; support means for supporting one of said primary and secondary on a foundation mounted on the ground; and conveyance support means for supporting the other of said primary and secondary on said conveyance, said slot permitting the support means which supports the primary to pass therethrough.

2. The apparatus of claim 1 wherein said foundation support means supports said primary along a wayside and said conveyance support means supports said secondary on said conveyance.

3. The apparatus of claim 1 wherein said foundation support means supports said secondary along a wayside and said conveyance support means supports said primary on said conveyance.

4. The apparatus of claim 1 wherein said coaxial array of coils of said primary comprises an array of circular coils arranged in successive, repeatable phases and supplied with respective phases of said electrical alternating currents.

5. The apparatus of claim 1 wherein said coaxial array of coils of said primary comprises a helically wound cylindrical solenoid tapped at equal intervals to provide leads for connection to respective phases of said electrical alternating currents.

6. The apparatus of claim 1 wherein said slot is disposed in a generally vertical plane.

7. The apparatus of claim 1 wherein said slot is disposed in a generally horizontal plane.

8. The apparatus of claim 1 wherein said electrical alternating currents exhibit a frequency corresponding to that normally supplied by power utilities.

* * * * *